US011190041B2

(12) United States Patent
Matsuno

(10) Patent No.: US 11,190,041 B2
(45) Date of Patent: Nov. 30, 2021

(54) CHARGE-DISCHARGE CONTROL APPARATUS AND CHARGE-DISCHARGE CONTROL APPARATUS METHOD

(71) Applicant: TOSHIBA TEC KABUSHIKI KAISHA, Tokyo (JP)

(72) Inventor: Hirokazu Matsuno, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 16/541,877

(22) Filed: Aug. 15, 2019

(65) Prior Publication Data

US 2019/0372386 A1    Dec. 5, 2019

Related U.S. Application Data

(63) Continuation of application No. 15/605,174, filed on May 25, 2017, now Pat. No. 10,432,011.

(30) Foreign Application Priority Data

May 31, 2016    (JP) ................. 2016-109289

(51) Int. Cl.
*H02J 7/02*    (2016.01)
*H02J 50/40*    (2016.01)
(Continued)

(52) U.S. Cl.
CPC ............ *H02J 7/025* (2013.01); *H02J 7/0029* (2013.01); *H02J 7/0068* (2013.01); *H02J 7/027* (2013.01);
(Continued)

(58) Field of Classification Search
CPC .. H02J 7/025; H02J 50/12; H02J 50/40; H02J 7/0029; H02J 7/0068; H02J 7/027; H02J 2007/004; H02J 5/005; H02J 17/00
See application file for complete search history.

(56) References Cited

U.S. PATENT DOCUMENTS

2012/0153903 A1    6/2012    Kim et al.
2013/0257168 A1*   10/2013   Singh ............... H02J 50/12
                                                     307/104
(Continued)

FOREIGN PATENT DOCUMENTS

JP    2005027421 A    1/2005
JP    2005094862 A    4/2005
(Continued)

OTHER PUBLICATIONS

Japanese Office Action dated Mar. 17, 2020, mailed in counterpart Japanese Application No. 2016-109289, 10 pages (with translation).

*Primary Examiner* — Carlos Amaya
(74) *Attorney, Agent, or Firm* — Kim & Stewart LLP

(57) ABSTRACT

According to an embodiment, a charge-discharge control apparatus includes a rectifier-voltage decrease detector circuit and an over-discharge suppression controller circuit. On the condition that the rectifier-voltage decrease detector circuit detects that voltage output from a rectifier circuit of a power-receiving device is decreased below a voltage threshold, the over-discharge suppression controller circuit suppresses over-discharge of an inverter circuit of a power-feeding device, or suppresses over-discharge of a battery of the power-receiving device.

7 Claims, 10 Drawing Sheets

24 : OVER-DISCHARGE SUPPRESSION CONTROLLER CIRCUIT

(51) Int. Cl.
*H02J 50/12* (2016.01)
*H02J 7/00* (2006.01)
(52) U.S. Cl.
CPC .............. *H02J 50/12* (2016.02); *H02J 50/40* (2016.02); *H02J 7/00306* (2020.01)

(56) References Cited

U.S. PATENT DOCUMENTS

2014/0145504 A1   5/2014   Kayama
2015/0340881 A1   11/2015  Nakano et al.
2018/0219402 A1   8/2018   Chen

FOREIGN PATENT DOCUMENTS

JP    2014107970 A   6/2014
JP    2014138478 A   7/2014
JP    2014180071 A   9/2014
JP    2015065724 A   4/2015
WO    2009136590 A1  11/2009

* cited by examiner

24 : OVER-DISCHARGE SUPPRESSION CONTROLLER CIRCUIT

58 : OVER-DISCHARGE SUPPRESSION CONTROLLER CIRCUIT

CHARGE-DISCHARGE CONTROL APPARATUS AND CHARGE-DISCHARGE CONTROL APPARATUS METHOD

CROSS-REFERENCE TO RELATED APPLICATIONS

This application is a continuation of U.S. patent application Ser. No. 15/605,174, filed on May 25, 2017, which is based upon and claims the benefit of priority from Japanese Patent Application No. 2016-109289, filed on May 31, 2016, the entire contents of each of which are incorporated herein by reference.

FIELD

Embodiments to be described herein generally relate to a charge-discharge control apparatus and a charge-discharge control method.

BACKGROUND

In recent years, a contactless power-feeding system for supplying power to devices without power cables is in practical use. In the contactless power-feeding system, a PC (Personal Computer) and a POS (Point of Sales) terminal are located on a power-feeding device. The contactless power-feeding system contactlessly supplies power to the PC and the POS terminal through the power-feeding device. Further, the contactless power-feeding system contactlessly supplies power to power-receiving devices of peripheral devices which include a printer device and the like.

When a coil of a power-feeding device is located close to a coil of a power-receiving device, the resonance phenomenon of the magnetic field is generated between the coils. In the contactless power-feeding system, a power-feeding device supplies power to a power-receiving device by using the resonance phenomenon, for example.

In the contactless power-feeding system, in order to make the power-transmission efficiency stable, the output voltage of a rectifier circuit of the power-receiving device is fed back to the power-feeding device. The contactless power-feeding system is configured to thereby control the voltage input in the power-feeding device side.

However, the current output from an inverter circuit of the power-feeding device and the discharge current of a battery of the power-receiving device may change rapidly depending on the variation of the gap between the primary coil of the power-feeding side and the secondary coil of the power-receiving side and depending on the variation of a load connected to the power-receiving side. When the current changes rapidly as described above, over-discharge and over-charge may occur in the contactless power-feeding system. In some cases, the contactless power-feeding system may stop operation, i.e., temporary blackout may occur.

DETAILED DESCRIPTION

Figure 1:
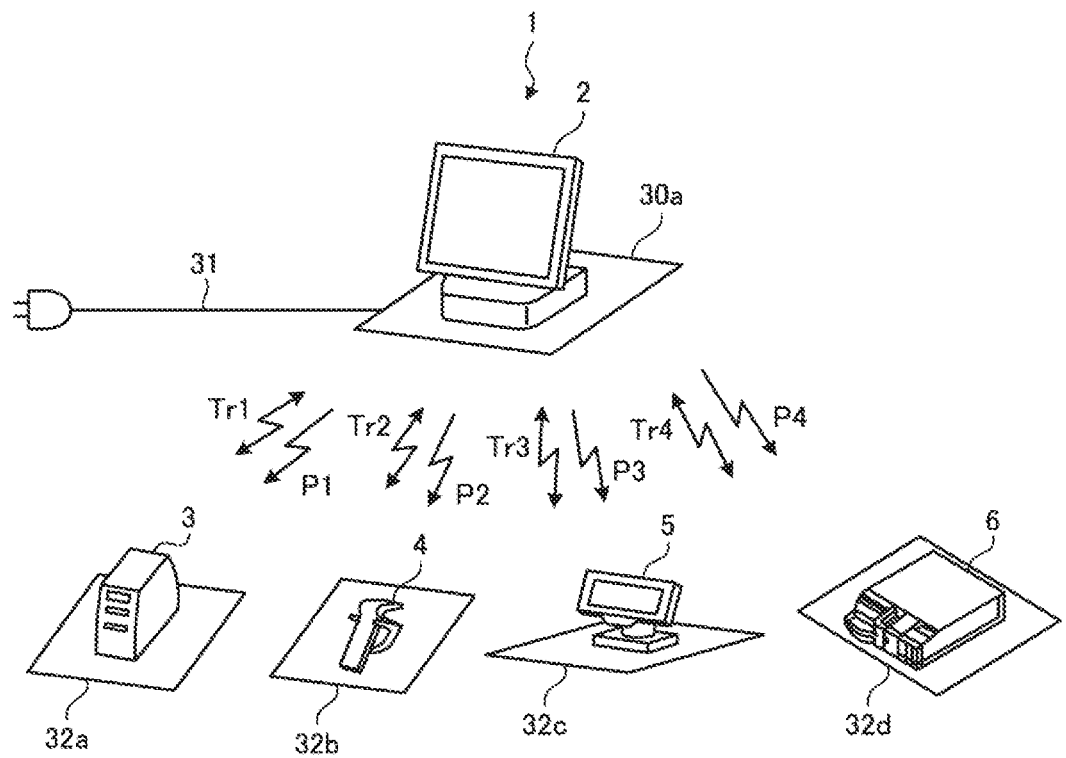
FIG. 1 is a diagram showing an entire configuration of the contactless power-feeding system of a first embodiment.

According to an embodiment, a charge-discharge control apparatus includes a power-feeding device, a power-receiving device, a rectifier-voltage decrease detector circuit, and an over-discharge suppression controller circuit. The power-feeding device includes an inverter circuit and a primary coil, a voltage output from the inverter circuit being applied to the primary coil. The power-receiving device includes a secondary coil, a battery, a load, and a rectifier circuit. The secondary coil receives power supplied from the primary coil contactlessly. The battery is charged with the received power of the secondary coil. The load operates with the received power of the secondary coil or the battery. The rectifier circuit supplies the received power to the load to operate the load, and supplies the received power to the battery to charge the battery. The rectifier-voltage decrease detector circuit detects that a voltage output from the rectifier circuit is decreased below a predetermined voltage value. The over-discharge suppression controller circuit controls, on the condition that the rectifier-voltage decrease detector circuit detects that the voltage output from the rectifier circuit is decreased below the predetermined voltage value, the battery or the inverter circuit to suppress over-discharge.

First Embodiment

Hereinafter, with reference to the drawings, a charge-discharge control apparatus of a first embodiment will be described in detail. In the drawings, the same reference symbols denote the same or similar components. Note that the embodiments to be described hereinafter are not for limitation.

FIG. 1 is a diagram showing an entire configuration of the contactless power-feeding system 1, which employs a charge-discharge control apparatus of a first embodiment. The contactless power-feeding system 1 includes the POS terminal 2 with a power-feeding device, and a plurality of peripheral devices each of which is with a power-receiving device. The plurality of peripheral devices include the printer device 3, the scanner 4, the display device 5, and the cashier 6 for bills and coins.

The POS terminal 2 sends/receives control information and other information to/from the printer device 3, the scanner 4, the display device 5, and the cashier 6 via the wireless transmission paths Tr1, Tr2, Tr3, Tr4, respectively. Specifically, the POS terminal 2 is connected to each peripheral device via, for example, near-field wireless communication, i.e., so-called NFC (Near Field Communication), or wireless communication such as Bluetooth (registered trademark) and Wi-Fi (registered trademark).

The POS terminal 2 executes sales register processing and payment processing for products sold at a store. The sales register processing includes receiving an input product code, displaying product information on the product name, the price, and the like of this product on the basis of the product code, and recording the product information. The payment processing includes displaying the total price for transaction on the basis of the sales-register-processed product information, executing payment on the basis of money accepted from a customer, and issuing a receipt.

The printer device 3 is a printer that prints product information and payment information on products for transaction, the information being sent from the POS terminal 2, on a predetermined sheet such as a receipt sheet as a receipt or a journal. The printer device 3 includes a thermal head as a print unit. Heater elements arrayed in a line in a thermal head are heated, and the heat is transferred to a sheet, i.e., thermal paper. The thermal paper is delivered by a platen roller, which is provided in front of the thermal head, and other components. At the same time, the thermal paper is heated by the heat transferred from the thermal head, and is thus colored. In this way, the printer device 3 controls the print unit to print information on a sheet.

The scanner 4 is a code scanner that optically reads a product code, which is coded, such as a barcode. The display device 5 is a display device such as a liquid crystal display that displays various information for an operator who operates the POS terminal 2 or a customer who purchases products. The cashier 6 is an automatic cashier that receives money, stores the received money, and automatically dispenses money (change) in response to a command (dispense command) from the POS terminal 2. Note that those peripheral devices are examples. The contactless power-feeding system 1 may include peripheral devices other than the above. Further, the contactless power-feeding system 1 only has to include at least one peripheral device.

The POS terminal 2 is mounted on the flat top surface portion of the contactless power-feeding device 30a (power-feeding device). A commercial power (not shown) is supplied to the contactless power-feeding device 30a via the power cable 31.

The printer device 3, the scanner 4, the display device 5, and the cashier 6 are mounted on the flat top surface portions of the contactless power-receiving devices 32a, 32b, 32c, 32d (power-receiving devices), respectively. Each of the contactless power-receiving devices 32a, 32b, 32c, 32d contactlessly receives power supplied from the contactless power-feeding device 30a, each of the contactless power-receiving devices 32a, 32b, 32c, 32d being mechanically in no connection with the contactless power-feeding device 30a. In other words, the contactless power-feeding device 30a supplies power to the contactless power-receiving devices 32a, 32b, 32c, 32d via the wireless power transmission paths P1, P2, P3, P4, respectively.

The printer device 3, the scanner 4, the display device 5, and the cashier 6 are driven by power received by the contactless power-receiving devices 32a, 32b, 32c, 32d, respectively. Further, batteries (described later) of the peripheral devices 3, 4, 5, 6 are charged with power received by the contactless power-receiving devices 32a, 32b, 32c, 32d, respectively.

The contactless power-feeding device 30a supplies power to the contactless power-receiving devices 32a, 32b, 32c, 32d, which are located near the contactless power-feeding device 30a, by using an electromagnetic induction method, a magnetic-field resonant method, or another method, the contactless power-feeding device 30a being mechanically in no connection with the contactless power-receiving devices 32a, 32b, 32c, 32d. In the present embodiment described, power is supplied by using the magnetic-field resonant method. Where the magnetic-field resonant method is used, the contactless power-feeding device 30a can supply power to the contactless power-receiving devices 32a, 32b, 32c, 32d, even the contactless power-feeding device 30a being distant from the contactless power-receiving devices 32a, 32b, 32c, 32d by about several centimeters to about two meters.

The magnetic-field resonant method is a method of contactlessly supplying power by using the resonance phenomenon. The resonance phenomenon is the phenomenon in which, for example, two objects configured to oscillate at the same frequency are placed closely, one object is oscillated, and then the oscillation is transmitted to the other object. Hereinafter, the principle of the magnetic-field resonant method will be described in summary.

According to the magnetic-field resonant method, a power-transmitting side for supplying power (the contactless power-feeding device 30a side) includes a coil (more accurately, LC circuit including coil and capacitor) as an object configured to oscillate. A power-receiving side for receiving the supplied power (each of the contactless power-receiving devices 32a, 32b, 32c, 32d side) includes a coil (more accurately, LC circuit including coil and capacitor) as an object configured to oscillate. The resonance frequency of the coil of the power-transmitting side is the same as the resonance frequency of the coil of the power-receiving side. When AC (alternating current) is supplied to the primary coil of the power-transmitting side, an oscillating magnetic field is generated. At this time, since the resonance frequency of the secondary coil of the power-receiving side is the same as the resonance frequency of the primary coil of the power-transmitting side, a magnetic field is also generated around the secondary coil of the power-receiving side. As a result, the secondary coil of the power-receiving side generates induction current flowing in the secondary coil of the power-receiving side, even the power-receiving side being mechanically in no connection with the power-transmitting side, i.e., even under the contactless status. As a result, the primary coil of the power-transmitting side is capable of contactlessly supplying power to the secondary coil of the power-receiving side. The secondary coil contactlessly receives power from the primary coil. Further, according to the magnetic-field resonant method, the transmission loss is low and the transmission efficiency is high, even the distance (gap) between the primary coil of the power-transmitting side and the secondary coil of the power-receiving side being large. The contactless power-supply using the magnetic-field resonant method will be described later in detail.

(Description on Hardware Configuration of Contactless Power-Feeding System)

Figure 2:
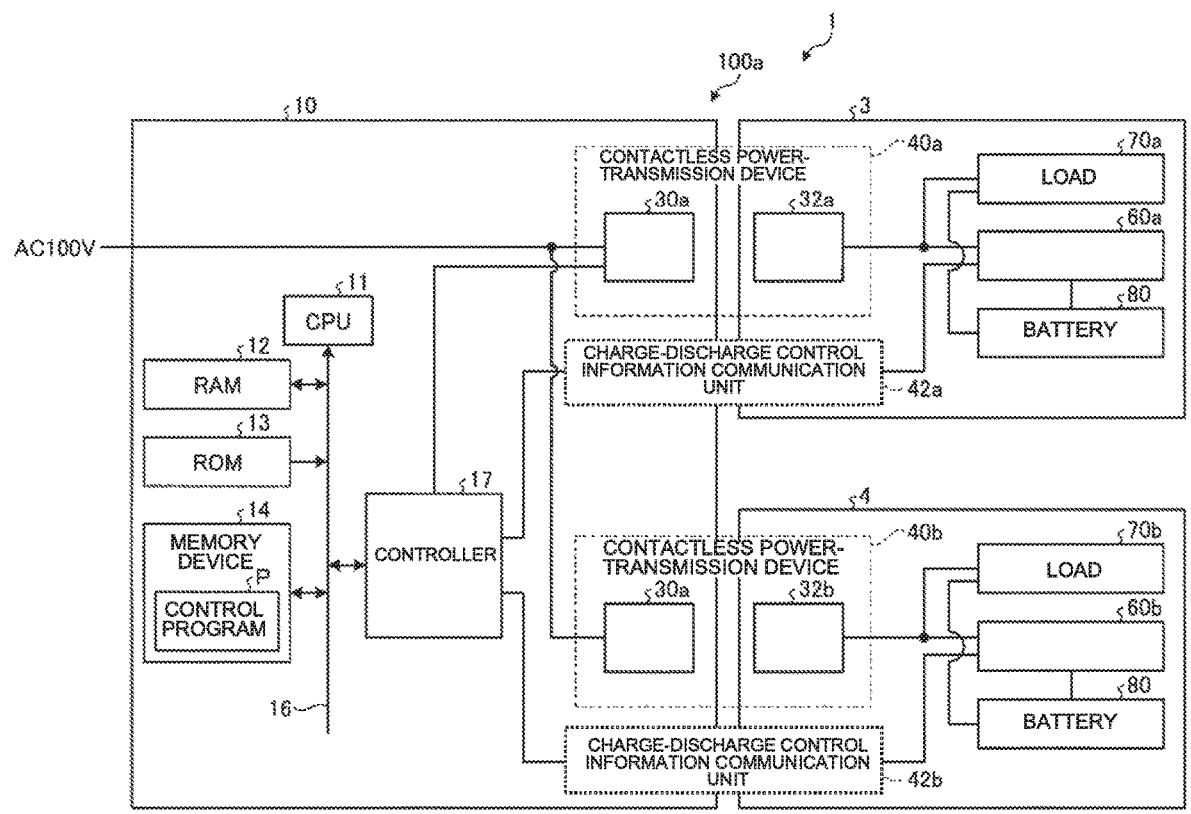
FIG. 2 is a hardware block diagram showing the hardware configuration of the contactless power-feeding system.

Next, with reference to FIG. 2, the hardware configuration of the contactless power-feeding system 1 will be described. FIG. 2 is a hardware block diagram schematically showing the hardware configuration of the contactless power-feeding system 1. Note that, in the hardware configuration schematically shown in FIG. 2, the printer device 3 and the scanner 4 are connected to the POS terminal 2, out of the contactless power-feeding system 1 of FIG. 1. The same hardware configuration applies to the case where the other peripheral devices, i.e., the display device 5 and the cashier 6, are connected to the POS terminal 2.

As shown in FIG. 2, the contactless power-feeding system 1 includes the charge-discharge control apparatus 100a. The charge-discharge control apparatus 100a includes the motherboard 10 of the POS terminal 2, the printer device 3, and the scanner 4. The motherboard 10 includes the CPU 11, the RAM 12, the ROM 13, the memory device 14, and the controller 17. The CPU 11, the RAM 12, the ROM 13, the memory device 14, and the controller 17 are connected to each other via the data bus 16. The contactless power-feeding system 1 further includes the contactless power-feeding devices 30a and the charge-discharge control information communication units 42a, 42b.

The CPU 11 executes the control program P (described later) to operate to control the overall behaviors of the charge-discharge control apparatus 100a.

The RAM 12 is a main storage device. When the CPU 11 operates, the CPU 11 decompresses various data in an executable format in the RAM 12. The ROM 13 stores various data. The memory device 14 includes a non-volatile memory such as an HDD (Hard Disc Drive) and a flash memory, which still stores data after power-off. The memory device 14 stores information such as the control program P executable by the CPU 11.

The controller 17 transfers various commands output from the CPU 11 to the respective units of the charge-discharge control apparatus 100a. Further, the controller 17 transfers information received from the respective units of the charge-discharge control apparatus 100a to the CPU 11.

The contactless power-feeding device 30a is an example of a power-feeding device. The contactless power-transmission device 40a includes the contactless power-feeding device 30a, and the contactless power-receiving device 32a (described later) located near the contactless power-feeding device 30a. Further, the contactless power-transmission device 40b includes the contactless power-feeding device 30a, and the contactless power-receiving device 32b (described later) located near the contactless power-feeding device 30a.

The charge-discharge control-information communication device 42a sends/receives information necessary to control charge-discharge to/from the motherboard 10 and the printer device 3. Further, the charge-discharge control-information communication device 42b sends/receives information necessary to control charge-discharge to/from the motherboard 10 and the scanner 4.

The printer device 3 includes the contactless power-receiving device 32a, the charge-discharge controller circuit 60a, the load 70a, and the battery 80.

The contactless power-receiving device 32a is an example of a power-receiving device. The contactless power-receiving device 32a is located near the above-mentioned contactless power-feeding device 30a. The contactless power-transmission device 40a includes the contactless power-receiving device 32a and the contactless power-feeding device 30a. The contactless power-receiving device 32a contactlessly receives power supplied from the contactless power-feeding device 30a.

The charge-discharge controller circuit 60a controls the battery 80 (described later) to be charged and discharged.

The load 70a includes some of the components of the printer device 3 that consume power. For example, the load 70a includes motors that rotate a platen roller to deliver a label sheet, a print unit for printing, a display device that displays information necessary for printing, and the like (not shown in FIG. 2).

The battery 80 stores power for driving the load 70a. Further, the battery 80 supplies the power to the load 70a to drive the load 70a.

The scanner 4 includes the contactless power-receiving device 32b, the charge-discharge controller circuit 60b, the load 70b, and the battery 80.

The contactless power-receiving device 32b is a unit the same as the above-mentioned contactless power-receiving device 32a.

The charge-discharge controller circuit 60b and the battery 80 are as described above.

The load 70b includes some of the components of the scanner 4 that consume power. For example, the load 70b includes an oscillator that generates a laser beam for reading barcodes, a power source for a light-receiving circuit including a photodiode, and the like (not shown in FIG. 2).

(Description on Circuit Configuration of Contactless Power-Feeding System)

Figure 3:
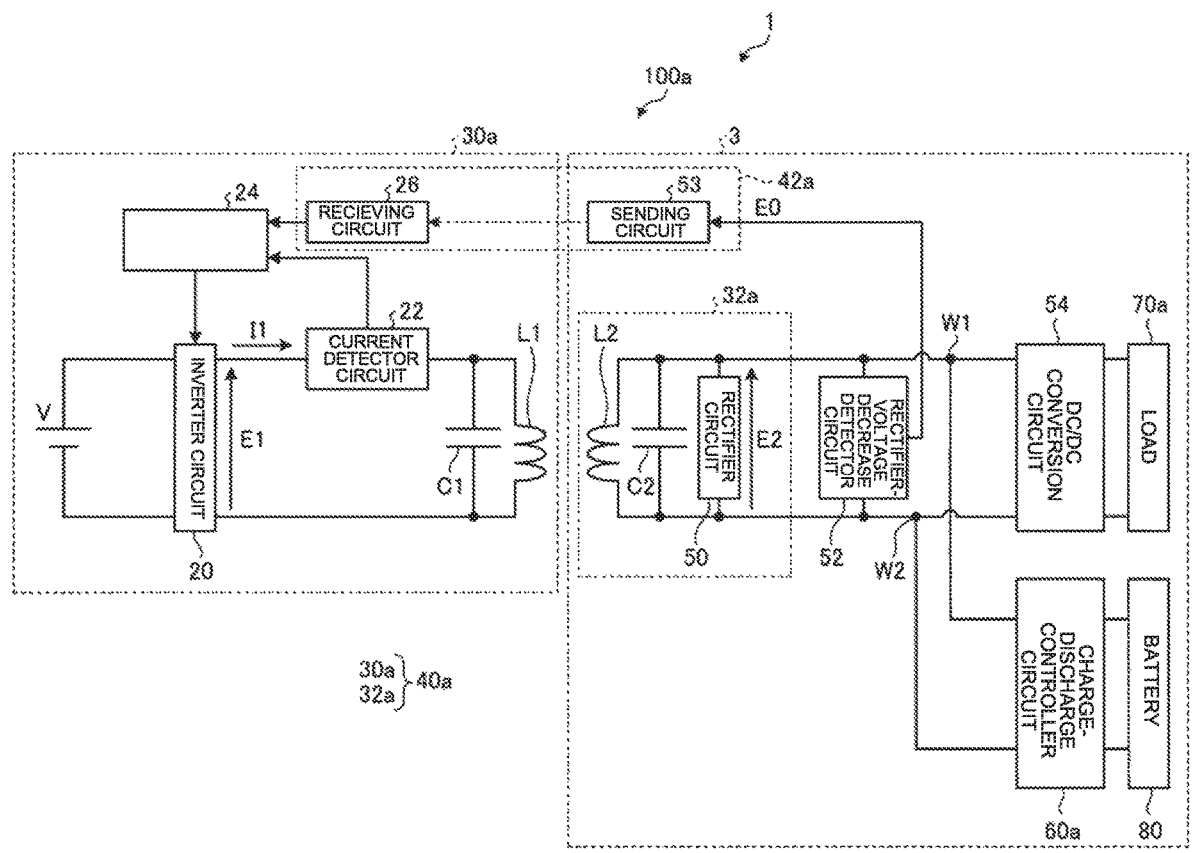
FIG. 3 is a diagram showing the main circuit configuration of the charge-discharge control apparatus of the first embodiment.

Next, with reference to FIG. 3, the circuit configuration of the charge-discharge control apparatus 100a of the contactless power-feeding system 1 will be described. FIG. 3 is a diagram showing the main circuit configuration of the charge-discharge control apparatus 100a. Note that FIG. 3 is a diagram showing the circuit configuration of the charge-discharge control apparatus 100a including the contactless power-feeding device 30a and the printer device 3, i.e., a peripheral device, as an example. The same circuit configuration applies to the case where a peripheral device other than the printer device 3 is connected to the contactless power-feeding device 30a. Therefore the following description will be made with reference to FIG. 3.

In FIG. 3, the charge-discharge control apparatus 100a includes the contactless power-feeding device 30a and the printer device 3. The printer device 3 is located near the contactless power-feeding device 30a.

The contactless power-feeding device 30a includes the DC (direct current) power source V, the inverter circuit 20, the current detector circuit 22, the primary coil L1 and the capacitor C1, the over-discharge suppression controller circuit 24, and the receiving circuit 26. The above-mentioned contactless power-transmission device 40a includes the contactless power-feeding device 30a and the contactless power-receiving device 32a (described later).

The inverter circuit 20 converts the DC voltage output from the DC power source V into AC voltage. Note that the DC power source V is generated by converting AC (e.g., 100 V, commercial power) to DC by a converter (not shown in FIG. 3). Firstly, the inverter circuit 20 turns on-and-off (choppers) DC voltage output from the DC power source V at a high speed by using a semiconductor switch, and thereby converts the DC voltage into a pulse wave. Then, the inverter circuit 20 treats the pulse wave obtained by conversion as a pulse-width-modulated (PWM) signal, and converts the pulse wave obtained by conversion into a voltage waveform, which has a wave-height value corresponding to a pulse width. When the inverter circuit 20 generates the pulse wave for the first time, the inverter circuit 20 generates the pulse wave having a waveform in which the pulse width varies sinusoidally. As a result, the inverter circuit 20 converts this pulse waveform into the sinusoidal voltage waveform. Therefore the inverter circuit 20 is capable of converting DC voltage output from the DC power source V into AC voltage having an arbitrary frequency and an arbitrary wave-height value. As a result, in FIG. 3, the inverter circuit 20 outputs the output voltage E1. Note that the inverter circuit 20 includes a semiconductor switch and a power-storing element such as an inductor and a reactor. Examples of the generally-known circuit configuration of the inverter circuit 20 include a full-bridge circuit, a half-bridge circuit, a single-transistor resonant circuit, and the like. Any circuit configuration may be applicable.

The current detector circuit 22 detects the amount of the current I1 flowing in the contactless power-feeding device 30a due to the output voltage E1 output from the inverter circuit 20.

As shown in FIG. 3, the primary coil L1 is connected to the capacitor C1 in parallel in the electric circuit of the contactless power-feeding device 30a. At this time, AC voltage having the frequency f (angular frequency ω (ω=2πf)) is applied to the electric circuit of the contactless power-feeding device 30a. Then, when the frequency f0 represented by Formula 1 is applied to the LC circuit including the primary coil L1 and the capacitor C1, the resonance phenomenon is generated. This frequency f0 will be referred to as resonance frequency.

$$f0 = 1/2\pi (L1C1)^{1/2} \quad \text{(Formula 1)}$$

Note that Formula 2 shows that the resonance frequency f0 is represented by the angular frequency ω0.

$$\omega 0 = 1/(L1C1)^{1/2} \quad \text{(Formula 2)}$$

The contactless power-receiving device 32a (described later) of the printer device 3 also includes a similar LC circuit. Then, when the resonance frequency of the LC circuit of the contactless power-receiving device 32a is the same as the resonance frequency f0 of the above-mentioned LC circuit of the contactless power-feeding device 30a, the contactless power-feeding device 30a transmits power to the contactless power-receiving device 32a. This will be described later in detail.

The over-discharge suppression controller circuit 24 is an example of an over-discharge suppression control means. The over-discharge suppression controller circuit 24 suppresses over-discharge of the inverter circuit 20. This will be described later in detail.

The receiving circuit 26 receives the rectifier-voltage decrease detection signal E0 (described later) from the contactless power-receiving device 32a side. The above-mentioned charge-discharge control-information communication device 42a includes the receiving circuit 26 and the sending circuit 53 (described later).

The printer device 3 includes the contactless power-receiving device 32a, the rectifier-voltage decrease detector circuit 52, the sending circuit 53, the DC/DC conversion circuit 54, the charge-discharge controller circuit 60a, the load 70a, and the battery 80.

The contactless power-receiving device 32a receives power from the above-mentioned contactless power-feeding device 30a. The contactless power-receiving device 32a includes the secondary coil L2, the capacitor C2, and the rectifier circuit 50.

As shown in FIG. 3, the secondary coil L2 is connected to the capacitor C2 in parallel in the electric circuit of the contactless power-receiving device 32a. Here, on the condition that the secondary coil L2 and the capacitor C2 satisfy Formula 3, the contactless power-receiving device 32a receives power from the above-mentioned contactless power-feeding device 30a.

$$1/2\pi (L1C1)^{1/2} = 1/2\pi (L2C2)^{1/2} \quad \text{(Formula 3)}$$

Note that the condition of Formula 3 is approximate. Strictly speaking, an appropriate power-transmitting condition is determined also with reference to, for example, the coupling coefficient indicating the level of coupling between the primary coil L1 and the secondary coil L2.

For example, the rectifier circuit 50 is a bridge circuit including a diode. The rectifier circuit 50 converts AC voltage received by the contactless power-receiving device 32a into DC voltage.

Figure 4:
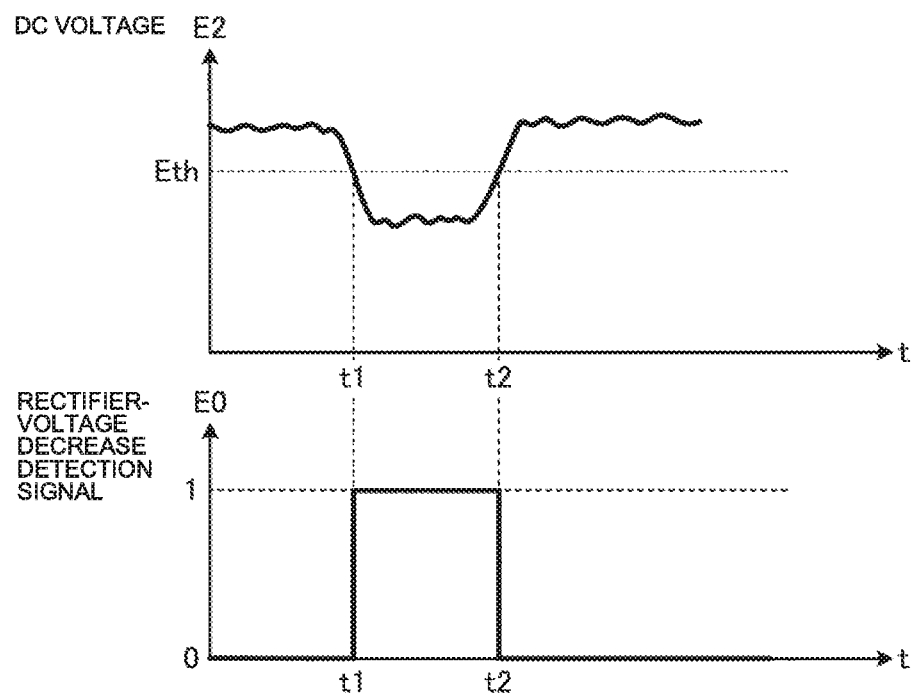
FIG. 4 is a diagram showing an example of a rectifier-voltage decrease detection signal.

The rectifier-voltage decrease detector circuit 52 is an example of a rectifier-voltage decrease detector means. The rectifier-voltage decrease detector circuit 52 measures DC voltage output from the contactless power-receiving device 32a, and detects that the measure DC voltage is decreased below a predetermined voltage value. Specifically, as shown in FIG. 4, the rectifier-voltage decrease detector circuit 52 detects the DC voltage E2, i.e., voltage output from the rectifier circuit 50. Then, on the condition that the rectifier-voltage decrease detector circuit 52 detects that the DC voltage E2 is decreased below the voltage threshold Eth, i.e., a predetermined voltage value, the rectifier-voltage decrease detector circuit 52 outputs the rectifier-voltage decrease detection signal E0. As shown in FIG. 4, as the rectifier-voltage decrease detection signal E0, "1" is output where the DC voltage E2 is decreased below the voltage threshold Eth, and "0" is output other than that. In the example of FIG. 4, the DC voltage E2, which is voltage output from the rectifier circuit 50, is decreased below the voltage threshold Eth between the time t1 and the time t2. Therefore the rectifier-voltage decrease detection signal E0 outputs "1" between the time t1 and the time t2.

Note that the DC voltage E2, i.e., voltage output from the rectifier circuit 50, is decreased depending on the variation of the gap between the primary coil L1 and the secondary coil L2 and depending on the variation of the load 70a. When the DC voltage E2 is decreased, the secondary coil L2 operates as if it is a DC reactor, and the DC voltage E2 is decreased at the time rate of change depending on the inductance of the secondary coil L2. Therefore the specific value of the voltage threshold Eth can be determined with reference to the time rate of change of the DC voltage E2 and the allowable voltage-decrease time for the load 70a.

The sending circuit 53 wirelessly sends the rectifier-voltage decrease detection signal E0 output from the rectifier-voltage decrease detector circuit 52 to the receiving circuit 26 of the contactless power-feeding device 30a.

The DC/DC conversion circuit 54 converts the DC voltage E2 into DC voltage appropriate for the load 70a (described later), and supplies power to the load 70a.

The charge-discharge controller circuit 60a is connected between the terminals W1, W2. The charge-discharge controller circuit 60a controls the battery 80 (described later) to be charged and discharged.

The load 70a includes some of the components of the printer device 3 that consume power. As described above, the load 70a includes motors, the print unit, the display unit, and the like.

The battery 80 is a secondary cell capable of being charged (storing electricity) and discharged, and is a lithium-ion cell, for example. Controlled by the above-mentioned charge-discharge controller circuit 60a, the battery 80 is charged with power received by the contactless power-receiving device 32a and supplies power to the load 70a.

(Description on Over-Discharge Suppression Control of Inverter)

Next, with reference to FIG. 5, the over-discharge suppression control of the inverter circuit 20 executed by the charge-discharge control apparatus 100a will be described.

Figure 5:
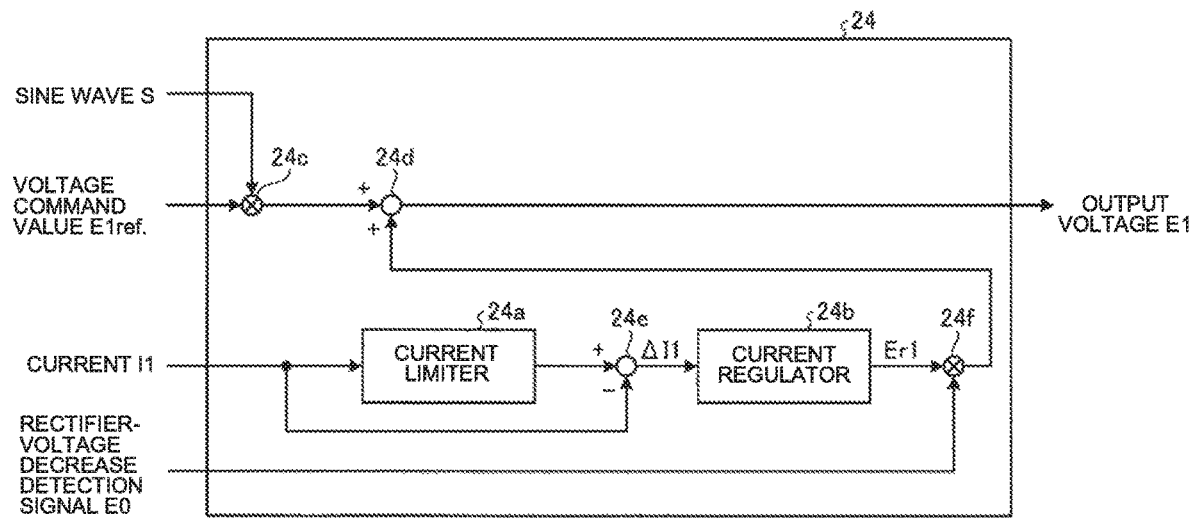
FIG. 5 is a block-and-line diagram showing the control configuration of the over-discharge suppression controller circuit.

FIG. 5 is a block-and-line diagram showing the control configuration of the over-discharge suppression controller circuit 24.

As shown in FIG. 5, the over-discharge suppression controller circuit 24 includes the current limiter 24a, the current regulator 24b, the integrator 24c, the adder 24d, the adder 24e, and the integrator 24f.

Figure 7:
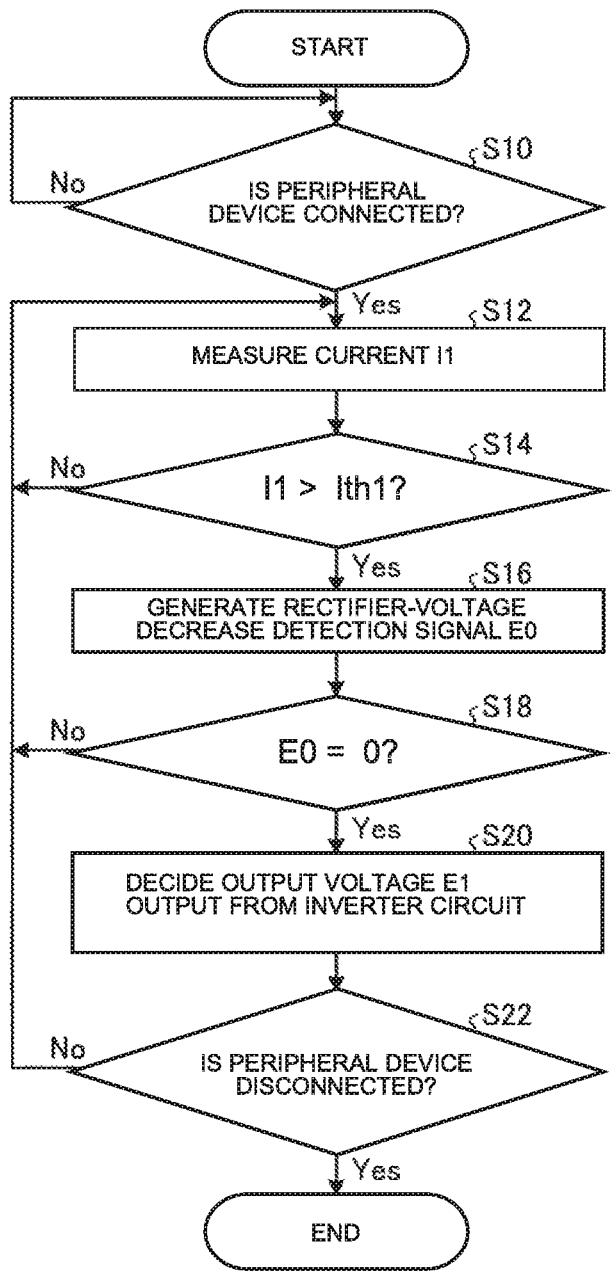
FIG. 7 is a flowchart showing the control flow of the charge-discharge control apparatus.

The current limiter 24a limits the current I1 (FIG. 3) flowing in the contactless power-feeding device 30a at a preset threshold, for example, the current threshold Ith1 in order that the current I1 may not reach a predetermined current value or more (see FIG. 7, Step S14). In other words, the current threshold Ith1 is the predetermined current value.

The current regulator 24b regulates the current such that the current excess amount ΔI1, i.e., the deviation of the current I1 and output from the current limiter 24a, is "0".

Each of the integrators 24c, 24f integrates two input signals. Then each of the integrators 24c, 24f outputs the signal obtained by integration.

Each of the adders 24d, 24e adds two input signals. Then each of the adders 24d, 24e outputs the signal obtained by addition.

Hereinafter, the control flow of the over-discharge suppression controller circuit 24 will be described in order. Firstly, the current I1 is input in the current limiter 24a, the current I1 being flowing in the contactless power-feeding device 30a depending on the output voltage E1 output from the inverter circuit 20 (FIG. 3). The current limiter 24a compares the current I1 with the preset current threshold Ith1. Where I1>Ith1, the current limiter 24a outputs the current I1 corresponding to the current threshold Ith1 as a limit-value. Meanwhile, where I1≤Ith1, the current limiter 24a outputs the current I1 as it is.

Next, the adder 24e subtracts the current value, which is output from the current limiter 24a, from the current I1. As a result of the subtraction, the current excess amount ΔI1 is calculated, the current excess amount ΔI1 being the excess amount of the current I1 over the current threshold Ith1.

The current regulator 24b outputs the voltage regulation value Er1 for regulating the current I1 in order to obtain the current excess amount ΔI1 "0".

The integrator 24f integrates the above-mentioned rectifier-voltage decrease detection signal E0 and the above-mentioned voltage regulation value Er1. In order to output "1" where the DC voltage E2 (FIG. 3) is decreased below the voltage threshold Eth and "0" other than that as the rectifier-voltage decrease detection signal E0, the integrator 24f outputs the voltage regulation value Er1 in the time period in which the DC voltage E2 is being decreased. Meanwhile, the integrator 24f outputs "0" in the time period in which the DC voltage E2 is not being decreased.

The integrator 24c integrates the voltage command value E1ref, i.e., a command value of the output voltage of the inverter circuit 20, and the sine wave S. The integrator 24c outputs a sine-wave-voltage-waveform command value.

The adder 24d adds the sine-wave-voltage-waveform command value, and the voltage regulation value Er1. The adder 24d outputs the output voltage E1, i.e., an output-voltage command value of the inverter circuit 20.

Figure 6:
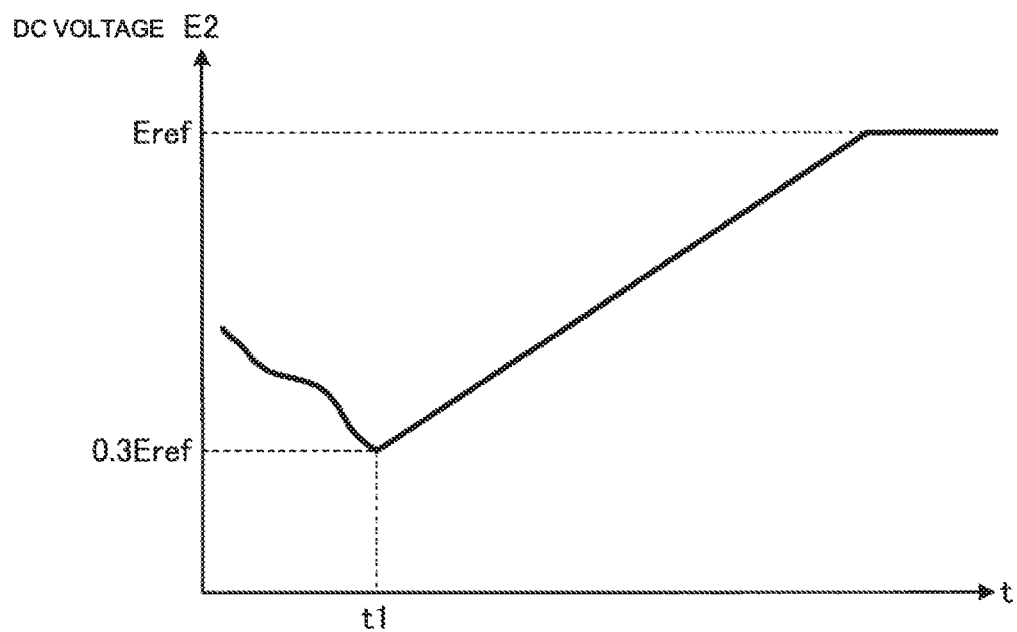
FIG. 6 is a graph showing an example in which, in the first embodiment, the voltage output from the rectifier circuit is controlled.

FIG. 6 is a graph showing an example in which, in the first embodiment, the voltage output from the inverter circuit 20 is actually controlled and the voltage output from the rectifier circuit 50 is thereby controlled. In FIG. 6, the DC voltage E2, i.e., the voltage output from the rectifier circuit 50, is decreased to reach 30% of the rated voltage Eref at the time t1, the rectifier-voltage decrease detection signal E0 is output at this time, and control of the voltage output from the inverter circuit 20 is started.

When the control of the voltage output from the inverter circuit 20 is started, the voltage output from the inverter circuit 20 increases. Then, together with the increase of the voltage output from the inverter circuit 20, power transmitted to the contactless power-receiving device 32a also increases. Therefore, as shown in FIG. 6, the DC voltage E2, i.e., the voltage output from the rectifier circuit 50, increases up to the rated voltage Eref. Finally, the DC voltage E2 reaches the rated voltage Eref.

(Description on Control Flow of Over-Discharge Suppression of Inverter)

Next, with reference to FIG. 7, the control flow of over-discharge suppression of the inverter circuit 20 executed by the charge-discharge control apparatus 100a will be described. FIG. 7 is a flowchart showing the control flow of the charge-discharge control apparatus 100a.

In Step S10, the controller 17 (FIG. 2) determines if a peripheral device is connected to the contactless power-feeding device 30a. Where a peripheral device is connected to the contactless power-feeding device 30a (Step S10; Yes), the control processing proceeds to Step S12. Otherwise (Step S10; No), the control processing repeats Step S10.

In Step S12, the current detector circuit 22 (FIG. 3) measures the amount of the current I1 output from the inverter circuit 20 and flowing in the contactless power-feeding device 30a.

In Step S14, the over-discharge suppression controller circuit 24 determines if the current I1 exceeds the current threshold Ith1. Where the current I1 exceeds the current threshold Ith1 (Step S14; Yes), the control processing proceeds to Step S16. Otherwise (Step S14; No), the control processing returns to Step S12.

In Step S16, the rectifier-voltage decrease detector circuit 52 generates the rectifier-voltage decrease detection signal E0 on the basis of the DC voltage E2 output from the rectifier circuit 50. Note that the generated rectifier-voltage decrease detection signal E0 is sent to the over-discharge suppression controller circuit 24 via the sending circuit 53 and the receiving circuit 26 (not shown in the flowchart).

In Step S18, the over-discharge suppression controller circuit 24 determines if the rectifier-voltage decrease detection signal E0 is "0". Where the rectifier-voltage decrease detection signal E0 is "0" (Step S18; Yes), the control processing proceeds to Step S20. Otherwise (Step S18; No), the control processing returns to Step S12.

In Step S20, the over-discharge suppression controller circuit 24 regulates the voltage command value E1ref on the basis of the voltage regulation value Er1 output from the current regulator 24b, and decides the output voltage E1 output from the inverter circuit 20.

In Step S22, the controller 17 (FIG. 2) determines if the peripheral device is disconnected. Where the peripheral device is disconnected (Step S22; Yes), the control processing is finished. Otherwise (Step S22; No), the control processing returns to Step S12.

Second Embodiment

Hereinafter, with reference to the drawings, a charge-discharge control apparatus of a second embodiment will be described in detail. In the drawings, the same reference symbols denote the same or similar components. Note that the embodiments to be described hereinafter are not for limitation.

Figure 8:
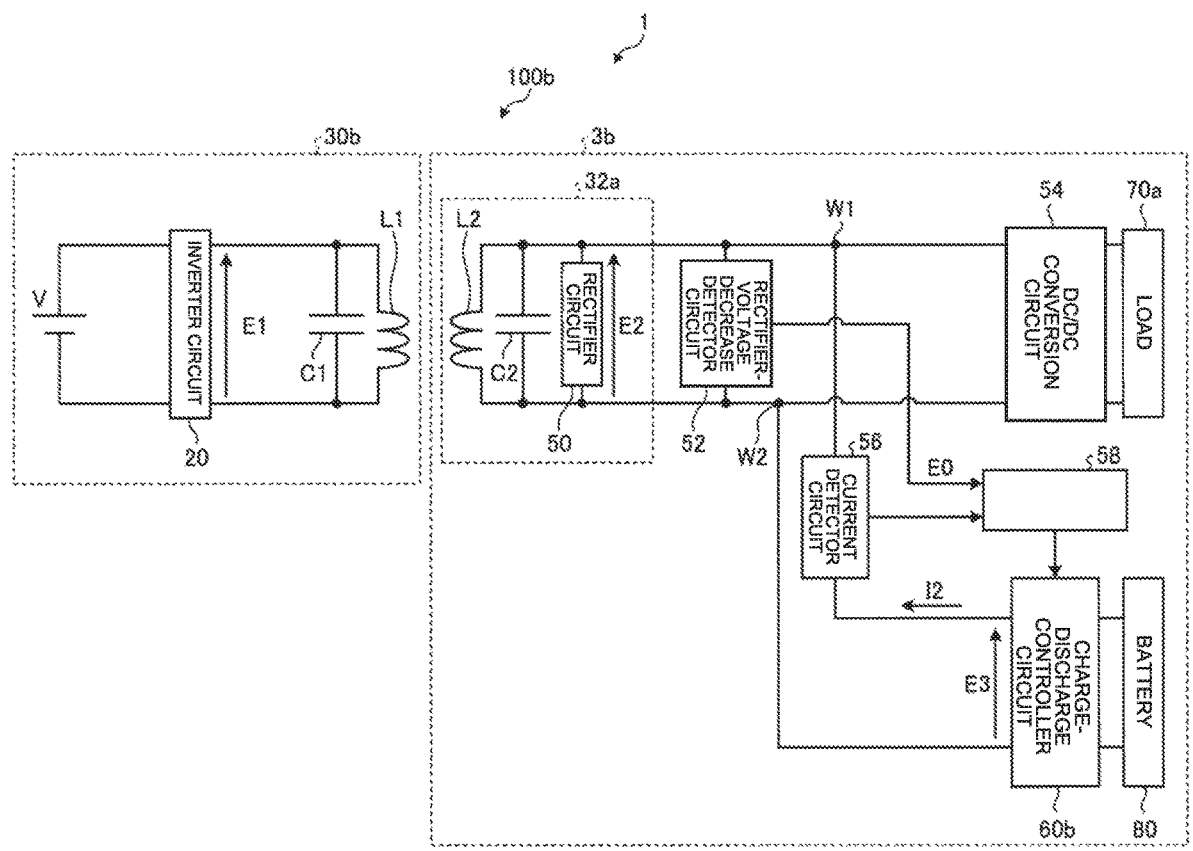
FIG. 8 is a diagram showing the main circuit configuration of the charge-discharge control apparatus of a second embodiment.

FIG. 8 is a diagram showing the main circuit configuration of the charge-discharge control apparatus 100b of the second embodiment. Note that FIG. 8 is a diagram showing the circuit configuration of the charge-discharge control apparatus 100b including the contactless power-feeding device 30b and the printer device 3b, i.e., a peripheral device, as an example. The same circuit configuration applies to the case where a peripheral device other than the printer device 3b is connected to the contactless power-feeding device 30b of the charge-discharge control apparatus 100b. Therefore the following description will be made with reference to FIG. 8.

In FIG. 8, the charge-discharge control apparatus 100b includes the contactless power-feeding device 30b and the printer device 3b. The printer device 3b is located near the contactless power-feeding device 30b.

The contactless power-feeding device 30b includes the DC power source V, the inverter circuit 20, the primary coil L1, and the capacitor C1. The respective components are similar to those described in the first embodiment, and description thereof will thus be omitted.

The printer device 3b includes the contactless power-receiving device 32a, the rectifier-voltage decrease detector circuit 52, the current detector circuit 56, the DC/DC conversion circuit 54, the over-discharge suppression controller circuit 58, the charge-discharge controller circuit 60b, the load 70a, and the battery 80.

The current detector circuit 56 detects the amount of the current I2 flowing between the terminal W1 and the terminal W2 due to the applied voltage E3 applied to both the terminals of the charge-discharge controller circuit 60b.

The over-discharge suppression controller circuit 58 suppresses over-discharge of the charge-discharge controller circuit 60b on the basis of the rectifier-voltage decrease detection signal E0 output from the rectifier-voltage decrease detector circuit 52 and the amount of the current I2 detected by the current detector circuit 56. This will be described later in detail.

The other components of the printer device 3b are similar to those described in the first embodiment, and description thereof will thus be omitted.

(Description on How to Suppress Over-Discharge of Inverter)

Figure 9:
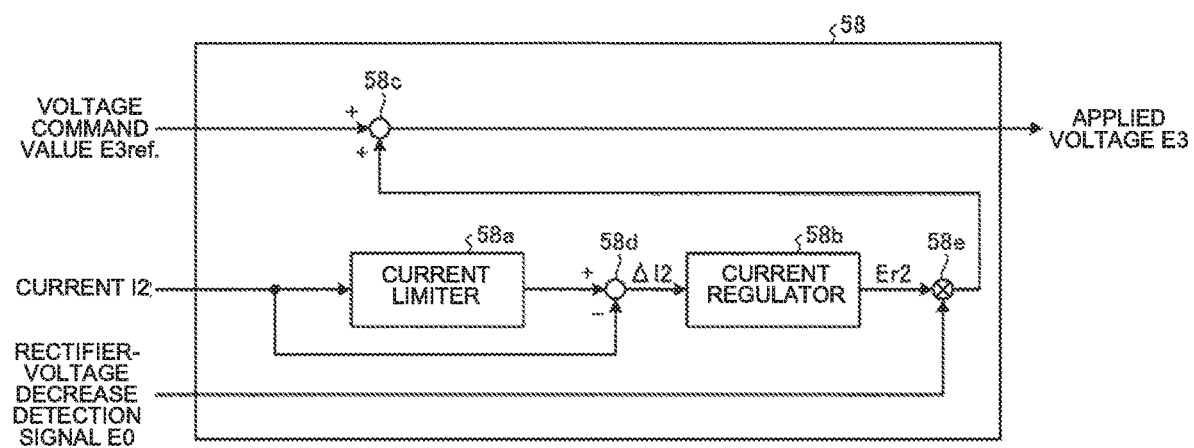
FIG. 9 is a block-and-line diagram showing the control configuration of the over-discharge suppression controller circuit.

Next, with reference to FIG. 9, how the charge-discharge control apparatus 100b suppresses over-discharge of the charge-discharge controller circuit 60b will be described. FIG. 9 is a block-and-line diagram showing the control configuration of the over-discharge suppression controller circuit 58.

As shown in FIG. 9, the over-discharge suppression controller circuit 58 includes the current limiter 58a, the current regulator 58b, the adder 58c, the adder 58d, and the integrator 58e.

Figure 10:
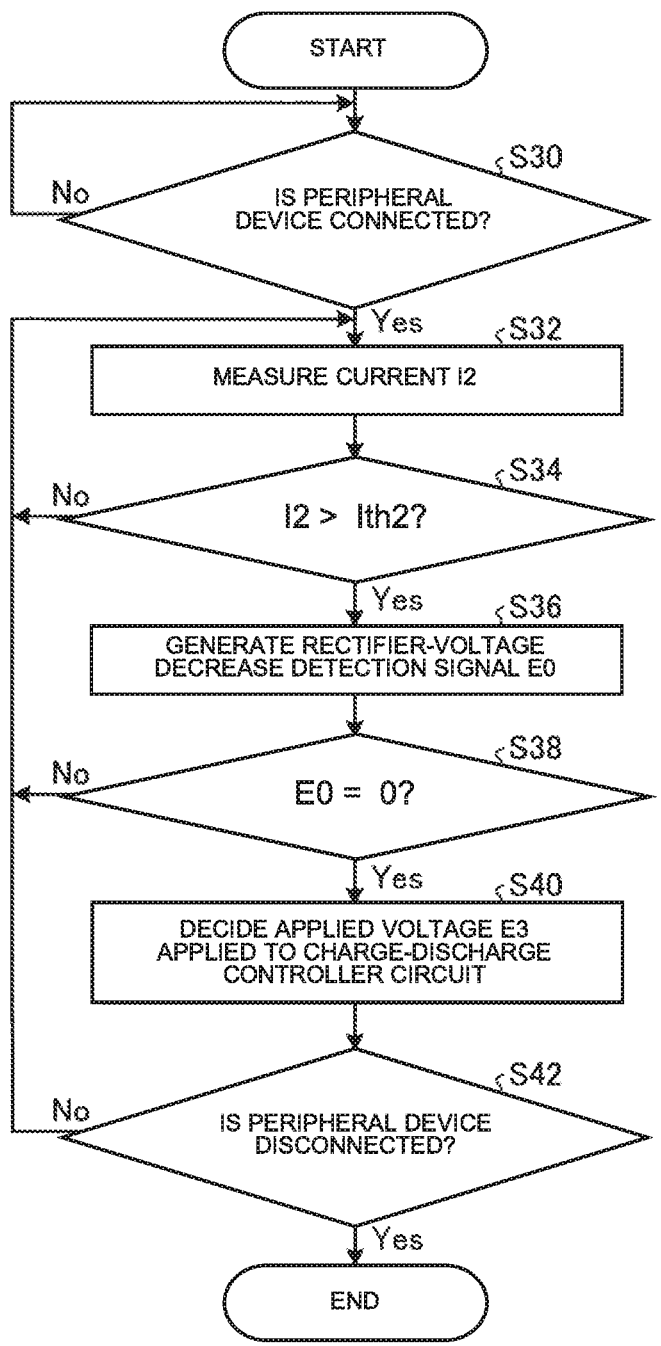
FIG. 10 is a flowchart showing the control flow of the charge-discharge control apparatus.

The current limiter 58a limits the current I2, which flows between the terminal W1 and the terminal W2 due to the applied voltage E3 applied to both the terminals of the charge-discharge controller circuit 60b, at a preset threshold, for example, the current threshold Ith2 in order that the current I1 may not reach a predetermined current value or more (see FIG. 10, Step S34). In other words, the current threshold Ith2 is the predetermined current value.

The current regulator 58b regulates the current such that the deviation of the current I2 and output from the current limiter 58a is "0".

The integrator 58e integrates two input signals. Then the integrator 58e outputs the signal obtained by integration.

Each of the adders 58c, 58d adds two input signals. Then each of the adders 58c, 58d outputs the signal obtained by addition.

Hereinafter, the control flow of the over-discharge suppression controller circuit 58 will be described in order. Firstly, the current I2 is input in the current limiter 58a, the current I2 being flowing between the terminal W1 and the terminal W2 due to the applied voltage E3 applied to both the terminals of the charge-discharge controller circuit 60b (FIG. 8). The current limiter 58a compares the current I2 with the preset current threshold th2. Where I2>Ith2, the current limiter 58a outputs the current I2 corresponding to the current threshold Ith2 as a limit-value. Meanwhile, where I2>Ith2, the current limiter 58a outputs the current I2 as it is.

Next, the adder 58d subtracts the current value, which is output from the current limiter 58a, from the current I2. As a result of the subtraction, the current excess amount ΔI2 is calculated, the current excess amount ΔI2 being the excess amount of the current I2 over the current threshold Ith1.

The current regulator 58b outputs the voltage command value Erg for regulating the current I2 in order to obtain the current excess amount ΔI2 "0".

The integrator 58e integrates the above-mentioned rectifier-voltage decrease detection signal E0 and the above-mentioned voltage command value Er2. What the rectifier-voltage decrease detection signal E0 indicates is as described above. Therefore the integrator 58e outputs the voltage command value Er2 in the time period in which the DC voltage E2 is being decreased. Meanwhile, the integrator 58e outputs "0" in the time period in which the DC voltage E2 is not being decreased.

The adder 58c adds the voltage command value E3ref applied to the charge-discharge controller circuit 60b and the above-mentioned voltage command value Er2. The adder 58c outputs the applied voltage E3 actually applied to the charge-discharge controller circuit 60b.

(Description on Control Flow of Over-Discharge Suppression of Charge-Discharge Circuit)

Next, with reference to FIG. 10, the control flow of over-discharge suppression of the charge-discharge controller circuit 60b executed by the charge-discharge control apparatus 100b will be described. FIG. 10 is a flowchart showing the control flow of the charge-discharge control apparatus 100b.

In Step S30, the controller 17 (FIG. 2) determines if a peripheral device is connected to the contactless power-feeding device 30b. Where a peripheral device is connected to the contactless power-feeding device 30b (Step S30; Yes), the control processing proceeds to Step S32. Otherwise (Step S30; No), the control processing repeats Step S30.

In Step S32, the current detector circuit 56 measures the amount of the current I2 flowing between the terminal W1 and the terminal W2 due to the applied voltage E3 applied to both the terminals of the charge-discharge controller circuit 60b.

In Step S34, the over-discharge suppression controller circuit 58 determines if the current I2 exceeds the current threshold Ith2. Where the current I2 exceeds the current threshold Ith2 (Step S34; Yes), the control processing proceeds to Step S36. Otherwise (Step S34; No), the control processing returns to Step S32.

In Step S36, the rectifier-voltage decrease detector circuit 52 generates the rectifier-voltage decrease detection signal E0 on the basis of the DC voltage E2 output from the rectifier circuit 50.

In Step S38, the over-discharge suppression controller circuit 58 determines if the rectifier-voltage decrease detection signal E0 is "0". Where the rectifier-voltage decrease detection signal E0 is "0" (Step S38; Yes), the control processing proceeds to Step S40. Otherwise (Step S38; No), the control processing returns to Step S32.

In Step S40, the over-discharge suppression controller circuit 58 regulates the voltage command value E3*ref* on the basis of the voltage regulation value Erg output from the current regulator 58*b*, and decides the applied voltage E3 applied to the charge-discharge controller circuit 60*b*.

In Step S42, the controller 17 (FIG. 2) determines if the peripheral device is disconnected. Where the peripheral device is disconnected (Step S42; Yes), the control processing is finished. Otherwise (Step S42; No), the control processing returns to Step S32.

As described above, according to each of the charge-discharge control apparatuses 100*a*, 100*b* of the embodiments, on the condition that the rectifier-voltage decrease detector circuit 52 (rectifier-voltage decrease detector means) detects that the DC voltage E2, i.e., the voltage output from the rectifier circuit 50, is decreased below the voltage threshold Eth (predetermined voltage value), the over-discharge suppression controller circuit 24 (over-discharge suppression control means) suppresses over-discharge of the inverter circuit 20, or the over-discharge suppression controller circuit 58 (over-discharge suppression control means) suppresses over-discharge of the battery 80. Therefore it is possible to suppress rapid change of the current I1 output from the inverter circuit 20 of each of the contactless power-feeding devices 30*a*, 30*b* (power-feeding device). In addition, it is possible to suppress rapid change of the current I2 output from the battery 80 of the contactless power-receiving device 32*a* (power-receiving device). It is possible to reliably prevent over-discharge/over-charge of the contactless power-feeding system 1 from occurring.

Further, according to each of the charge-discharge control apparatuses 100*a*, 100*b* of the embodiments, on the condition that the DC voltage E2, i.e., the voltage output from the rectifier circuit 50, is decreased below the voltage threshold Eth (predetermined voltage value), the rectifier-voltage decrease detector circuit 52 (rectifier-voltage decrease detector means) outputs the rectifier-voltage decrease detection signal E0. Therefore it is possible to reliably detect decrease of the voltage output from the rectifier circuit 50.

Further, according to each of the charge-discharge control apparatuses 100*a*, 100*b* of the embodiments, the primary coil L1 supplies power to the secondary coil L2 by using the magnetic-field resonant method. Therefore each of the contactless power-feeding devices 30*a*, 30*b* (power-feeding device) is capable of contactlessly supplying power to the contactless power-receiving device 32*a* (power-receiving device) stably.

Further, according to the charge-discharge control apparatus 100*a* of the embodiment, on the condition that the current I1 output from the inverter circuit 20 exceeds the current threshold Ith1 (predetermined current value), the over-discharge suppression controller circuit 24 (over-discharge suppression control means) decreases the output voltage E1 output from the inverter circuit 20 depending on an excess amount over the current threshold Ith1. Therefore it is possible to reliably prevent over-discharge/over-charge of the contactless power-feeding system 1 and temporary blackout of the contactless power-feeding system 1 from occurring.

Further, according to the charge-discharge control apparatus 100*b* of the embodiment, on the condition that the current I2 output from the battery 80 exceeds the current threshold Ith2 (predetermined current value), the over-discharge suppression controller circuit 58 (over-discharge suppression control means) decreases the applied voltage E3 applied to the charge-discharge controller circuit 60*b* to charge the battery 80, i.e., applied to the battery 80, depending on an excess amount over the current threshold Ith2. Therefore it is possible to reliably prevent over-discharge/over-charge of the contactless power-feeding system 1 and temporary blackout of the contactless power-feeding system 1 from occurring.

Note that, according to the example of the first embodiment described above, on the condition that the current I1 output from the inverter circuit 20 exceeds the current threshold Ith1, the output voltage E1 of the inverter circuit 20 is decreased depending on an excess amount over the current threshold Ith1. According to the example of the second embodiment described above, on the condition that the current I2 output from the battery 80 exceeds the current threshold Ith2, the applied voltage E3 applied to the battery 80 to charge the battery 80 is decreased depending on an excess amount over the current threshold Ith2. The current I1 output from the inverter circuit 20 and the applied voltage E3 applied to the battery 80 may be controlled simultaneously.

Further, in the first embodiment described above, the contactless power-feeding device 30*a* (power-feeding device) is mounted on the motherboard 10. Alternatively, the contactless power-feeding device 30*a* may be independent of the motherboard 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A charge-discharge control apparatus, comprising:
a power-feeding device including:
an inverter circuit, and
a primary coil, a voltage output from the inverter circuit being applied to the primary coil;
a power-receiving device including:
a secondary coil that receives power supplied from the primary coil without contacting the primary coil, and
a rectifier circuit that supplies the received power to a load to operate the load and to a battery to charge the battery;
a rectifier-voltage decrease detector circuit that detects when a voltage output from the rectifier circuit decreases to be below a predetermined voltage value; and
an over-discharge suppression controller circuit that controls at least one of the battery or the inverter circuit to suppress over-discharging when the rectifier-voltage decrease detector detects that the voltage output from the rectifier circuit has decreased to be below the predetermined voltage value, wherein
the power-feeding device includes a current detector circuit that detects a current output from the inverter circuit and flowing in the primary coil, the over-discharge suppression controller circuit determines whether the current detected by the current detector circuit exceeds a predetermined current value, and when the current detected by the current detector circuit is determined to exceed the predetermined current value, the over-discharge suppression controller circuit determines whether the rectifier-voltage decrease detector circuit also detects the voltage output from the rectifier circuit has decreased below the predetermined voltage value.

2. The charge-discharge control apparatus according to claim 1, wherein when the current output from the inverter circuit and flowing in the primary coil exceeds the predetermined current value, the over-discharge suppression controller circuit controls the inverter circuit to decrease the voltage output from the inverter circuit by an amount corresponding to an amount by which the current output from the inverter circuit and flowing in the primary coil exceeds the predetermined current value.

3. The charge-discharge control apparatus according to claim 1, wherein when a current flowing in the battery exceeds a predetermined current value, the over-discharge suppression controller circuit decreases a voltage applied to the battery by an amount corresponding to an amount by which the current flowing in the battery exceeds the predetermined current value.

4. The charge-discharge control apparatus according to claim 1, wherein the rectifier-voltage decrease detector circuit outputs a rectifier-voltage decrease detection signal when the voltage output from the rectifier circuit decreases to be below the predetermined voltage value.

5. The charge-discharge control apparatus according to claim 4, wherein the secondary coil is supplied with power from the primary coil by a magnetic-field resonant method.

6. A charge-discharge control apparatus, comprising:
a power-feeding device including:
an inverter circuit, and
a primary coil, a voltage output from the inverter circuit being applied to the primary coil;
a power-receiving device including:
a secondary coil that receives power supplied from the primary coil without contacting the primary coil, and
a rectifier circuit that supplies the received power to a load to operate the load and to a battery to charge the battery;
a rectifier-voltage decrease detector circuit that detects when a voltage output from the rectifier circuit decreases to be below a predetermined voltage value;
an over-discharge suppression controller circuit that controls at least one of the battery or the inverter circuit to suppress over-discharging when the rectifier-voltage decrease detector detects that the voltage output from the rectifier circuit has decreased to be below the predetermined voltage value; and
a current detector circuit that detects a current output from the rectifier circuit, wherein
the over-discharge suppression controller circuit determines whether the current detected by the current detector circuit exceeds a predetermined current value, and
when the current detected by the current detector circuit is determined to exceed the predetermined current value, the over-discharge suppression controller circuit determines whether the rectifier-voltage decrease detector circuit also detects that the voltage output from the rectifier circuit has decreased below the predetermined voltage value.

7. The charge-discharge control apparatus according to claim 6, wherein the secondary coil is supplied with power from the primary coil by a magnetic-field resonant method.

\* \* \* \* \*